July 11, 1961 — W. S. GLOVER ET AL — 2,991,896
REINFORCED GLASS AEROSOL CONTAINERS
Filed Dec. 30, 1957
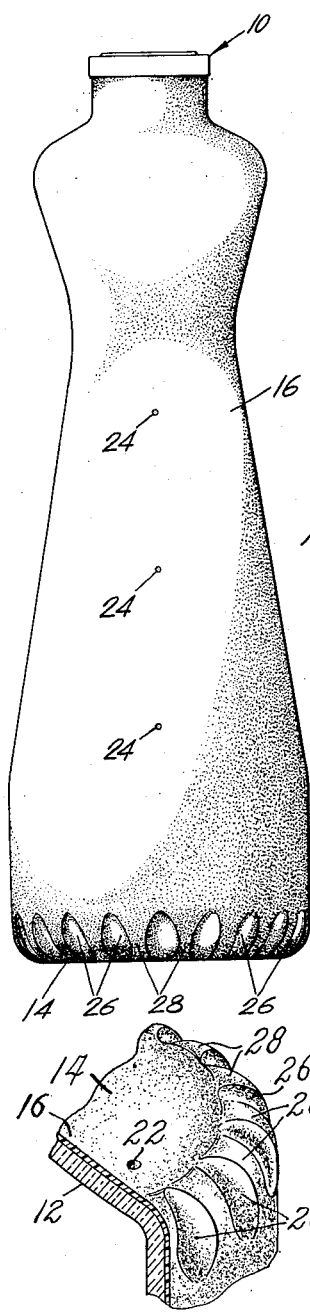
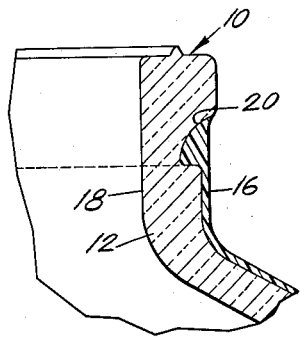
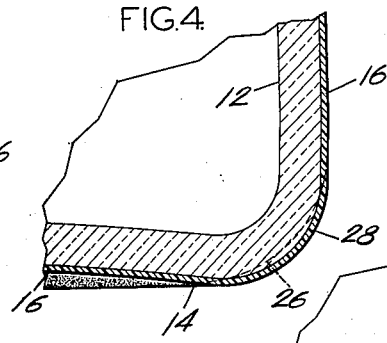
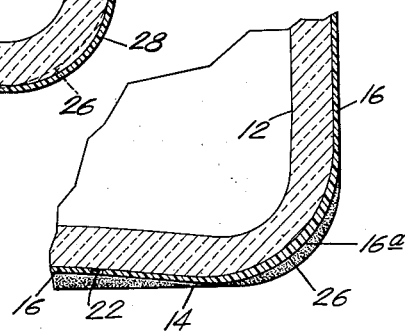
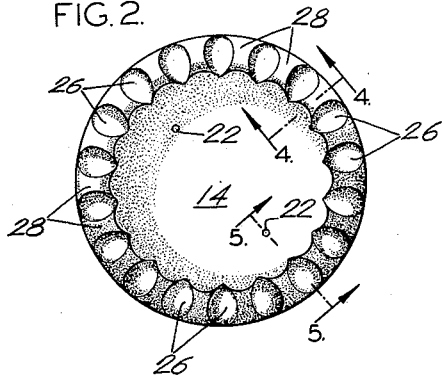
INVENTORS:
WILLIAM S. GLOVER
JOSEPH F. WEST
BY Howson & Howson
ATTYS.

United States Patent Office 2,991,896
Patented July 11, 1961

2,991,896
REINFORCED GLASS AEROSOL CONTAINERS
William S. Glover, Vineland, and Joseph F. West, Millville, N.J., assignors to Wheaton Glass Company, Millville, N.J., a corporation of New Jersey
Filed Dec. 30, 1957, Ser. No. 706,157
6 Claims. (Cl. 215—12)

This invention relates to the art of aerosol containers and is a continuation in part of our copending application S. N. 622,647, filed November 16, 1956. The present invention, like our aforementioned copending application, embodies certain features and advantages of the copending application of Joseph F. West, S.N. 486,564, filed February 7, 1955, now Patent No. 2,906,462, and provides improvements in details over these features.

As pointed out in the said West application, there are certain marked advantages in the use of glass containers of this type. It has not been practical heretofore to utilize metal or plastic containers for products in the nature of cosmetics, and certain medicinal and chemical products, adapted to be dispensed in aerosol form due to certain ingredients which tended to corrode or weaken the containers, and additionally chemical reactions frequently took place which severely damaged the products. Attempts have been made to utilize glass or the like bottles, which are substantially inert to the essential oils and other chemicals in preparations of this character. Where the preparations or substances, however, are adapted to be projected or discharged from the container under pressure and in aerosol form, there is the inherent danger of the hazard of flying glass under the impelling force of the volatile propellant, in case of accidental breakage of the bottle.

The inventions described and claimed in the aforesaid applications provided commercially acceptable solutions for this problem, and have made it possible to attain the obvious advantages of use of glass in these containers, while minimizing the hazard of flying glass. A primary object of the present invention has been to reduce this hazard still further by eliminating the chance of breakage of the bottle in a manner which will create this hazard, even in the unusual types of impact where there is a certain residual element of risk, while at the same time overcoming certain difficulties in manufacturing procedures resulting from the structures and steps adapted and taught in these copending applications.

As pointed out in our copending application, extensive experimentation with aerosol bottles coated with perforated elastic sheathing shows there is a possibility that when a bottle is dropped in certain attitudes and broken in a manner possible to produce a flying glass hazard, it has frequently been the result of simultaneous impact against the floor or ground of elements or portions of the bottle forming lines or areas on the exterior surface thereof of substantial continuity or extent such for example as the peripheral edge of the bottom of the bottle. When the bottle has one or more such lines or areas, for example, a seam of substantial length may be opened up along a line or area to release flying glass if the bottle falls in a position such as to cause this simultaneous impact of such a substantial length line or area with the floor or ground and such lines or areas can be termed critical lines or areas.

In our copending application, the danger of opening of a seam in the plastic sheathing was avoided in practice by providing a plurality of localized projections extending beyond the normal surface of the bottle along such lines or areas. These localized projections on the exterior surface of the bottle extending outwardly from the normal surfaces thereof underly a plastic sheathing or coating after it is applied to the bottle. Such projections were spaced over the critical lines or areas in such a way as to produce substantially tangential or point impact at their locations, instead of line or area impact as might be the case if they were omitted. If breakage of the plastic sheathing occurred by impact at these projections, the breakage is highly localized and therefore results only in one or more small punctures which permits escape of the propellant gas without flying glass.

While the danger of opening up such a seam in the plastic sheathing was substantially avoided by the provision of these projections extending outwardly from the line of critical ridges or areas, such raised projections or knobs created manufacturing difficulties in that separable part molds were required to provide for release of the glass container after molding. Additionally, in some bottle designs and under some circumstances such projections which extended outwardly from the normal surfaces of the bottle were undesirable for packing, storing and use. It was also found that there was a tendency toward a thinning out of the plastic on these projections with a consequent decrease in overall efficiency.

It is accordingly an object of the present invention to provide a container construction which retains the meritorious advantages of these previous constructions, while providing an improved construction from the standpoint of the end product and permitting easier manufacture thereof with a resultant decrease in manufacturing costs. As is well-known, manufacturing cost of containers of this nature is a substantial item with reference to their adoption and use by the trade.

Still further objects and features of the invention will be apparent from the following detailed description thereof when taken together with the accompanying drawings in which:

FIG. 1 is an elevational view of a glass container adapted for containing a product under pressure, to be dispensed in aerosol form, and having an elastically expansible plastic coating or sheathing thereon;

FIG. 2 is a bottom plan view of the container of FIG. 1;

FIG. 3 is a fragmentary sectional view of the container having a structure permitting interlocking and sealing of the plastic sheathing with the neck portion of the bottle to prevent sudden release of volatile vapor and broken glass in the event of breakage of the neck, upon falling in a substantially upside down position;

FIG. 4 is a fragmentary sectional view taken on line 4—4 of FIG. 2;

FIG. 5 is a fragmentary sectional view taken on line 5—5 of FIG. 2; and

FIG. 6 is a fragmentary isometric view of the bottom portion of the container.

While the features which are unique to the present invention may be utilized in different types of containers and in different manners, their greatest usefulness is attained in conjunction with the primary features of the aforesaid West application, and provide constructional and manufacturing advantages with respect to our aforesaid copending application, of which the present application is a continuation in part.

As taught in these previous applications, a glass bottle 10 is coated over its main body 12, including its bottom 14 with a plastic sheathing 16. This sheathing 16 extends upwardly and surrounds, at its upper end, the neck 18 of the bottle, which is provided with a peripheral groove 20 of a nature disclosed in the aforesaid West application, although manifestly other types of means can be used at the neck area to permit interconnection or sealing of the plastic sheath with the glass container as shown, for example, in our aforesaid parent application. While all the structure for attaining this end is not shown, the present invention is adapted for use in a container construction where the sheathing and glass container will be in sealed relationship at the neck to prevent danger from flying glass, if the neck is broken, which might tend to release the connection between a dispensing valve mechanism and the upper end of the plastic sheathing, with a consequent sudden release of volatile vapor and broken glass. As pointed out in the aforesaid copending applications, different means are provided for maintaining this sealed and interlocked relationship between the plastic sheathing and the upper end of the bottle.

The sheathing 16 is preferably elastically expansible and may be formed by dipping or spraying to apply a liquid resin precursor such as a polymerized vinyl chloride plastisol composition to the bottle exterior, and thereafter curing the applied composition to provide a coating having the necessary tensile and tear strength to resist rupture. The resulting cured product is non-adherent to the surface of the bottle and it is therefore susceptible to becoming inflated by the directly applied pressure of the propellant gas upon breakage of the glass of the bottle which it envelops. Since it is desirable that the propellant gas be vented gradually from the elastic sheathing as thus inflated, a number of small perforations 22 may be formed through the bottom wall surface of the plastic either during the formation or after and/or, if desired, a plurality of perforations 24 can be formed through the side surface of the sheathing as shown in FIG. 1 of the drawings.

Bottles having these features have become familiar articles of commerce through promotion of the invention and the present invention involves still further improvements thereof. It has been determined experimentally that sheathings as described in the mentioned copending applications, and hereinbefore, which surround the bottles in substantially non-adherent relationship thereto prevent ejection of glass upon breakage in most situations. This is especially true where the force of the impact does not cause a breakage of the plastic sheathing, but only shatters the surrounded glass. It is also true even in cases in which the sheathing is punctured, so long as the impact is such as to produce only a small puncture, as in the case where the impact is restricted to a single point or small area. However, there are usually certain lines or areas on the exterior surface of the bottle with considerable continuity or extent in a single line or plane, such for example as the peripheral edge of the bottom of the bottle and if the bottle falls with this line or plane downward and parallel to the surface of the floor or ground, this may result in producing a puncture or gash of substantial length or size at the locus of the impact. When this occurs, glass will be projected through this opening before the vent holes can complete their function of venting the propellant vapor.

As pointed out in our previously filed copending application, the provision of a plurality of localized projections on the exterior surface of the bottle so that they underlie the plastic sheathing or coating after it is applied, and which projections are spaced over the critical lines or areas as defined hereinbefore in such a way as to produce substantially point impact at their locations, instead of line or area impact as might be the case if they were omitted, cause localized breakage of the plastic sheathing by impact at these projections. This results merely in one or more small punctures which will allow escape of the propellant without flying glass.

It has been found under certain circumstances however, that when projections were utilized which extend outwardly beyond the normal surface of the bottle along such critical lines or areas, there has been a tendency for the plastic sheath to thin out in these localized areas and additionally when manufacturing bottles having the outwardly extended projections, the molds themselves must be provided with recesses for formation of the projections, and this caused difficulty of removal of the finished bottle from the molds.

In the present invention the same advantages afforded by the outwardly extended projections are retained, while overcoming these aforesaid drawbacks as well as those previously mentioned herein. In accordance with the present invention, and particularly with reference to the circumference or periphery of the base area where it merges into the bottle side walls, means are utilized to eliminate continuity of the exterior surface of the bottle in a single line or plane. As shown in the drawings, a plurality of substantially evenly spaced indented depressions 26 are formed in this circumference around the base where it flows into the sides of the bottles. These can be of different shapes, although as shown in the drawings are substantially pear or teardrop shaped. The provision of these indented depressions at spaced intervals interrupts the normal surface continuity of the bottle and creates therebetween a plurality of corrugations or ridges 28. These areas 28 in effect result in substantially the same effect as in our aforementioned copending application, to insure substantially point impact at their locations instead of line or area impact, as might be the case if they were omitted. Breakage of the plastic sheathing occurring by impact at these projections will accordingly be highly localized, and will therefore merely produce one or more small punctures which will allow escape of propellant without flying glass.

Other advantages are derived as a result of this type of construction one of which resides in permitting a build up of plastic material in the indentations as shown at 16a, with no thinning out, because of a tendency of the plastic material utilized to level out over the bottle surface. The formation of the indentations, as compared with outwardly extending projections, also permits a base plate to be used for making the indentations in the bottles without parts being in the mold proper, so that the finished product can be easily removed from the mold.

While the invention has been described above primarily with relation to a circular bottle and to a certain specific form which it may take, manifestly persons skilled in the art will recognize that it is possible to apply, modify or refine it in various ways without departing from its basic concepts. We therefore wish it to be understood that this invention is not to be limited in interpretation except by the scope of the following claims.

We claim:

1. A container adapted to contain a product under pressure to be dispensed in aerosol form comprising a frangible bottle having a discharge opening, said bottle having lines and areas on the exterior surface of normal substantial continuity, a continuous sheath of elastically expansible plastic material freely overlying substantially the entire exterior surface of the bottle and secured to said surface in sealing engagement therewith only adjacent said discharge opening, said bottle having a plurality of spaced localized depressions underlying said sheath and forming therebetween spaced ridges, said ridges interrupting the normal surface continuity of said bottle where provided, to produce substantially point impact locations, said sheath being elastically expansible by said pressure when released upon explosive fracture of the bottle, said sheath having tensile and tear strengths to withstand the initial explosive force and when expanded having tensile and tear strengths operable within the elastic limits of said sheath to confine and retain said pressure and the fracture fragments of the bottle, and said sheath having at least one vent therein operable upon expansion of said sheath to gradually exhaust said pressure therefrom while still retaining therein the fracture fragments of said bottle.

2. A container as claimed in claim 1, said bottle including a base and body portion extending therefrom, said depressions being along the line of juncture between said base and body portions.

3. A container as claimed in claim 1, said vent being in the base of said bottle.

4. A container as claimed in claim 1, said depressions being of smooth contours.

5. A container as claimed in claim 1, said bottle being of decreased thickness at the locations of said depressions.

6. A container as claimed in claim 5, said sheath being of increased thickness in said depressions.

References Cited in the file of this patent

UNITED STATES PATENTS

| | | |
|---|---|---|
| 151,246 | Schreiber | May 26, 1874 |
| 2,563,508 | Anschicks | Aug. 7, 1951 |
| 2,565,954 | Dey | Aug. 28, 1951 |
| 2,610,940 | Endicott | Sept. 16, 1952 |
| 2,756,105 | Magill | July 24, 1956 |
| 2,781,551 | Richerod | Feb. 19, 1957 |